US012725608B2

(12) United States Patent
Zhang et al.

(10) Patent No.: US 12,725,608 B2
(45) Date of Patent: Sep. 1, 2026

(54) AUTOMATIC SPEECH RECOGNITION WITH MULTILINGUAL SCALABILITY AND LOW-RESOURCE ADAPTATION

(71) Applicant: International Business Machines Corporation, Armonk, NY (US)

(72) Inventors: Yang Zhang, Cambridge, MA (US); Kaizhi Qian, Champaign, IL (US); Chuang Gan, Cambridge, MA (US); Zhenfang Chen, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 18/659,514

(22) Filed: May 9, 2024

(65) Prior Publication Data

US 2025/0349284 A1 Nov. 13, 2025

(51) Int. Cl.
*G10L 15/065* (2013.01)
*G10L 15/00* (2013.01)
*G10L 15/06* (2013.01)
*G10L 15/16* (2006.01)

(52) U.S. Cl.
CPC .......... *G10L 15/065* (2013.01); *G10L 15/063* (2013.01); *G10L 15/16* (2013.01); *G10L 15/005* (2013.01); *G10L 2015/0635* (2013.01)

(58) Field of Classification Search
CPC ... G10L 15/005; G10L 15/063; G10L 15/065; G10L 2015/0635; G10L 15/16
USPC .................................................. 704/232, 244
See application file for complete search history.

(56) References Cited

U.S. PATENT DOCUMENTS

| | | | | |
|---|---|---|---|---|
| 12,354,002 | B1 * | 7/2025 | Weber | G10L 15/22 |
| 2018/0137109 | A1 | 5/2018 | Mangoubi et al. | |
| 2021/0294970 | A1 * | 9/2021 | Bender | G06N 5/022 |
| 2022/0309340 | A1 * | 9/2022 | Leal | G06N 3/08 |
| 2022/0310069 | A1 | 9/2022 | Ren et al. | |
| 2023/0214605 | A1 * | 7/2023 | Bérard | G06F 40/42 704/2 |
| 2024/0005912 | A1 * | 1/2024 | Agrawal | G10L 15/16 |
| 2025/0078815 | A1 * | 3/2025 | Ding | G10L 15/063 |
| 2025/0095652 | A1 * | 3/2025 | Chen | G10L 15/063 |

(Continued)

OTHER PUBLICATIONS

Kulkarni, Atharva, et al. "Adapting the adapters for code-switching in multilingual ASR." arXiv preprint arXiv:2310.07423, Oct. 2023, pp. 1-5. (Year: 2023).*

(Continued)

*Primary Examiner* — James S Wozniak
(74) *Attorney, Agent, or Firm* — Amin, Turocy & Watson, LLP

(57) ABSTRACT

Systems and techniques that facilitate multilingual ASR machine learning models are provided. For example, one or more embodiments described herein can comprise a system, which can comprise a memory that can store computer executable components. The system can also comprise a processor, operably coupled to the memory that can execute the computer executable components stored in memory. The computer executable components can comprise an automatic speech recognition machine learning model that learns shared weights across one or more languages in a set of target languages; and a training component that trains the automatic speech recognition model.

20 Claims, 10 Drawing Sheets

300

(56) References Cited

U.S. PATENT DOCUMENTS

| | | | | |
|---|---|---|---|---|
| 2025/0149026 | A1* | 5/2025 | Wang | G06F 21/6245 |
| 2025/0246181 | A1* | 7/2025 | Ngai | G10L 15/32 |
| 2025/0272541 | A1* | 8/2025 | Yan | G06N 3/0455 |
| 2025/0279089 | A1* | 9/2025 | Liu | G10L 25/30 |

OTHER PUBLICATIONS

Lee, et al. "Embedding articulatory constraints for low-resource speech recognition based on large pre-trained model." Proc. Interspeech. Aug. 2023, pp. 1394-1398. (Year: 2023).*

Lu, Yizhou, et al. "Language adaptive cross-lingual speech representation learning with sparse sharing sub-networks." ICASSP 2022-2022 IEEE International Conference on Acoustics, Speech and Signal Processing (ICASSP). IEEE, Mar. 2022, pp. 1-5. (Year: 2022).*

Qin, Siqing, et al. "Improving low-resource Tibetan end-to-end ASR by multilingual and multilevel unit modeling." EURASIP Journal on Audio, Speech, and Music Processing Jan. 2022, Jan. 2022, pp. 1-10. (Year: 2022).*

Wang, Pu. "Bottleneck low-rank transformers for low-resource spoken language understanding." arXiv preprint arXiv:2206.14318, Jun. 2022, pp. 1-5. (Year: 2022).*

Zhu, Yun, et al. "Multilingual Speech Recognition with Self-Attention Structured Parameterization." Interspeech. Oct. 2020, pp. 4741-4745. (Year: 2020).*

Fu, Yonggan, et al. "Losses can be blessings: Routing self-supervised speech representations towards efficient multilingual and multitask speech processing." Advances in Neural Information Processing Systems 35. Dec. 2022, pp. 1-19. (Year: 2022).*

Xie, et al. "Dynamic asr pathways: An adaptive masking approach towards efficient pruning of a multilingual asr model." ICASSP 2024-2024 IEEE International Conference on Acoustics, Speech and Signal Processing (ICASSP). IEEE, Apr. 2024, pp. 12201-12205. (Year: 2024).*

Yang, Mu, et al. "Learning asr pathways: A sparse multilingual asr model." ICASSP 2023-2023 IEEE International Conference on Acoustics, Speech and Signal Processing (ICASSP). IEEE, Sep. 2023, pp. 1-5. (Year: 2023).*

Egorova, et al., "Manual and Semi-Automatic Approaches to Building a Multilingual Phoneme Set," Published in: 2013 IEEE International Conference on Acoustics, Speech and Signal Processing, Date of Conference: May 26-31, 2013, DOI: 10.1109/ICASSP.2013.6639085.

Wang, et al., "MiniLMv2: Multi-Head Self-Attention Relation Distillation for Compressing Pretrained Transformers," arXiv:2012.15828v2 [cs.CL] Jun. 27, 2021.

Andersen, et al., "On the Use of Data-Driven Clustering Technique for Identification of Poly- and Mono-phonemes for four European Languages," Published in: Proceedings of ICASSP '94. IEEE International Conference on Acoustics, Speech and Signal Processing, Date of Conference: Apr. 19-22, 1994, DOI: 10.1109/ICASSP.1994.389340.

Yu, et al., "Master-ASR: Achieving Multilingual Scalability and Low-Resource Adaptation in ASR with Modular Learning," arXiv:2306.15686v1 [eess.AS] Jun. 23, 2023.

* cited by examiner

500

QKV/Projection Weights

Binary Mask $B_l$

Artisan QKV/Projection Weights

Top-k Selection

Frozen Params

Language 1
Language 2
Language 3
Language 4

Expanded Mapping Matrix $[T\ T']$ $M_1$
$M_2$
$M_3$
$M_4$

A set of Specialist Scores $M_k, k \in [K]$

600

| Method | Inference | Training | Storage | Average CER |
|---|---|---|---|---|
| Separate Weight Tuning | 1x | 1x | 1x | 12.71 |
| Shared Weight Tuning | 1x | 0.57x | 0.02x | 19.48 |
| Mask Tuning | 0.8x | 0.57x | 0.05x | 22.10 |
| Weight Factorization | 1x | 0.57x | 0.02x | 16.65 |
| Language Layers | 1x | 0.57x | 0.67x | 14.37 |
| Master-ASR-Adapter | 1.02x | 0.57x | 0.04x | 17.35 |
| Multilingual Scalable Model | 0.7x | 0.57x | 0.04x | 14.24 |

| Method | Param. | sr | gn | ha | pa | or | myv | Avg. |
|---|---|---|---|---|---|---|---|---|
| Weight Tuning | 301M | 29.37 | 22.14 | 31.05 | 25.28 | 30.17 | 28.35 | 27.52 |
| Mask Tuning | 301M | **25.14** | 20.31 | 27.62 | 22.83 | 26.72 | 25.99 | 24.77 |
| Adapter Tuning | 25M | 26.37 | 21.16 | 28.74 | 23.69 | 27.52 | 27.31 | 25.80 |
| Multilingual Scalable Model | 0.62M | 26.01 | 20.72 | 28.36 | 22.97 | 27.04 | 26.48 | 25.26 |
| Multilingual Scalable Model + ft | 301M | 25.23 | **20.28** | **27.51** | **22.75** | **26.64** | **25.86** | **24.71** |

FIG. 7

AUTOMATIC SPEECH RECOGNITION WITH MULTILINGUAL SCALABILITY AND LOW-RESOURCE ADAPTATION

BACKGROUND

The subject disclosure relates to artificial intelligence use cases, and more specifically, to automatic speech recognition with multilingual scalability and low-resource adaptation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that scalable multilingual automatic speech recognition machine learning models.

According to an embodiment, a system can comprise a processor that executes computer executable components stored in memory. The computer executable components can comprise an automatic speech recognition machine learning model that learns shared weights across one or more languages in a set of target languages; and a training component that trains the automatic speech recognition model, wherein the training comprises: learning, using a projection layer of the automatic speech recognition machine learning model, a mapping matrix comprising rows of specialist scores for the one or more languages in the set of target languages; generating a set of binary masks for the one or more languages in the set of target languages; and adapting the automatic speech recognition machine learning model to the one or more languages of the set of target languages by applying the set of binary masks to one or more pretrained weights of the projection layer.

According to another embodiment, a computer-implemented method can comprise training, by a system operatively coupled to a processor, an automatic speech recognition machine learning model to learn shared weights across one or more languages in a set of target languages, wherein the training comprises: learning, by the system, using a projection layer of the automatic speech recognition machine learning model, a mapping matrix comprising rows of specialist scores for the one or more languages in the set of target languages; generating, by the system, a set of binary masks for the one or more languages in the set of target languages; and adapting, by the system, the automatic speech recognition machine learning model to the one or more languages of the set of target languages by applying the set of binary masks to one or more pretrained weights of the projection layer.

According to another embodiment, a computer program product can comprise a computer readable storage medium having program instructions embodied therewith, the program instructions executable by a processor to cause the processor to train, by the processor, an automatic speech recognition machine learning model to learn shared weights across one or more languages in a set of target languages, wherein the training comprises: learning using a projection layer of the automatic speech recognition machine learning model, a mapping matrix comprising rows of specialist scores for the one or more languages in the set of target languages; generating a set of binary masks for the one or more languages in the set of target languages; and adapting the automatic speech recognition machine learning model to the one or more languages of the set of target languages by applying the set of binary masks to one or more pretrained weights of the projection layer.

DESCRIPTION OF THE DRAWINGS

FIG. 6 illustrates a chart comparing performances of one or more multilingual ASR approaches in accordance with one or more embodiments described herein.

FIG. 7 illustrates a chart comparing performances of one or more multilingual ASR approaches for low-resource languages in accordance with one or more embodiments described herein.

Figure 1:
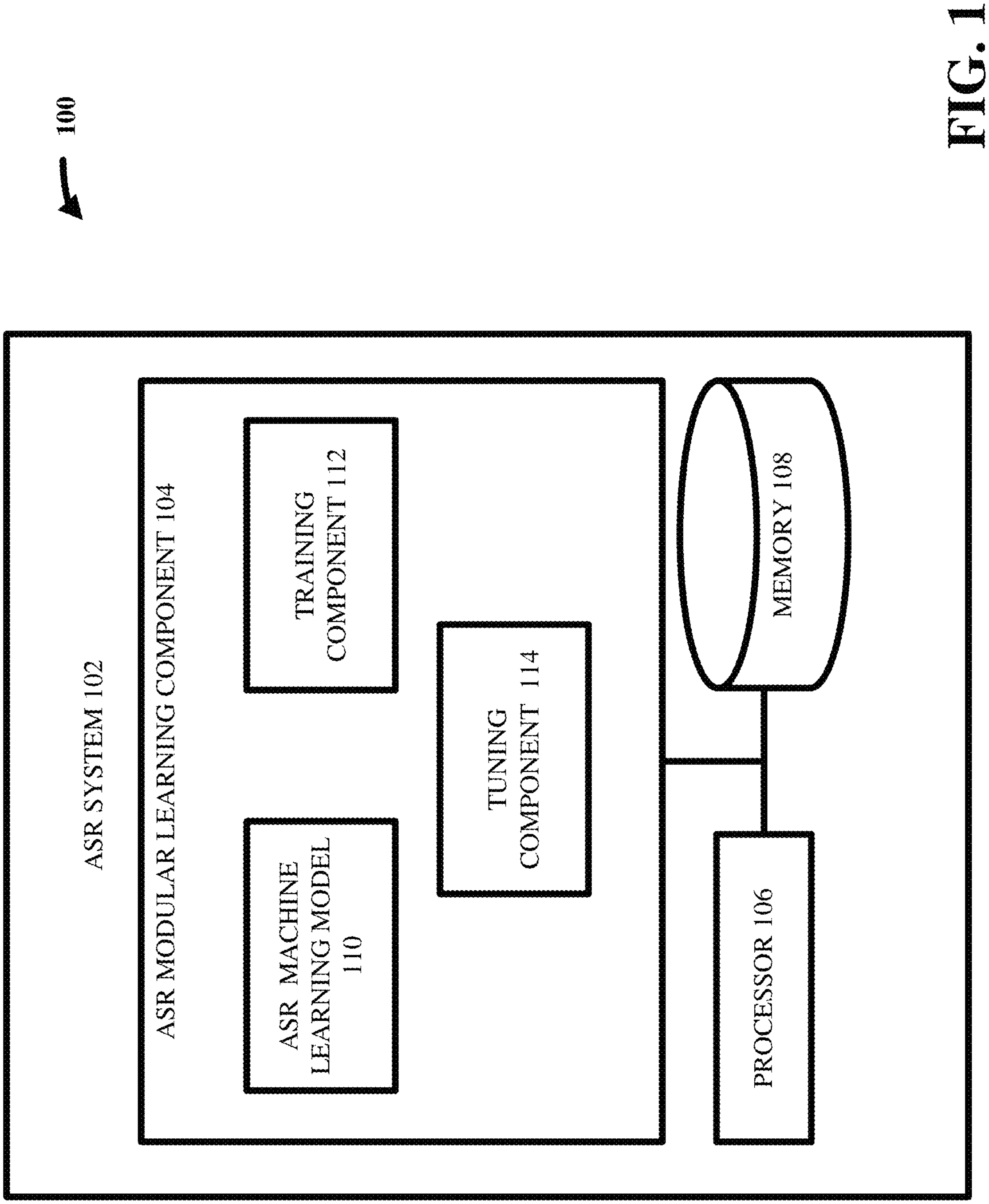
FIG. 1 illustrates a block diagram of an example, non-limiting, systems that can facilitate a scalable multilingual machine learning model in accordance with one or more embodiments described herein.

Appendix A is a detailed paper describing various embodiments and is to be considered part of this patent specification.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As referenced herein, an "entity" can comprise a client, a user, a computing device, a software application, an agent, a machine learning (ML) model, an artificial intelligence (AI) model, and/or another entity.

Recent developments have produced automatic speech recognition (ASR) machine learning models that offer strong performance in monolingual scenarios, when equipped with sufficient resources (e.g., sufficient computing power, sufficient storage, and large amounts of labeled training data).

However, in real world environments, ASR models face two significant challenges. First is the issue of multilingual scalability. An ideal ASR model would be able to support multiple languages, while avoiding excessive overhead in terms of training, inferences and computer storage. For example, separate models can be utilized for each language, but this requires a large storage overhead to store multiple models as well as increases the computing resources called for to train the multiple models. While models do exist that use adapters to adapt pretrained models to specific languages or larger models with dedicated training recipes for specific languages, these approaches either lead to high training costs, require separate adapters for each language, and/or lead to larger model sizes creating storage issues. The second issue is that of low-resource languages. Some languages are considered “low-resource”, that is there exists a relatively small amount of training data available for the language. Creating labeled training data for these languages is both expensive and time consuming, thereby creating a bottleneck for the production of additional training data. Further, the limited training data negatively impacts performance of ASR models as limited training data prevents comprehensive training. While there have been attempts to adapt pretrained models to low-resource languages, these attempts have led to overfitting and catastrophic forgetting by the model, thereby preventing effective usage.

In view of the problems discussed above, the present disclosure can be implemented to produce a solution to one or more of these problems by training, by a system operatively coupled to a processor, an ASR machine learning model to learn shared weights across one or more languages in a set of target languages, wherein the training comprises: learning, by the system, using a projection layer of the automatic speech recognition machine learning model, a mapping matrix comprising rows of specialist scores for the one or more languages in the set of target languages; generating, by the system, a set of binary masks for the one or more languages in the set of target languages; and adapting, by the system, the automatic speech recognition machine learning model to the one or more languages of the set of target languages by applying the set of binary masks to one or more pretrained weights of the projection layer. By learning shared weights between multiple languages in the set of target languages, the ASR model described herein can be trained on multiple languages without the need for a unique training step for each language, thereby decreasing the amount of training required, both in time and in computational resources utilized.

In one or more embodiments, a further solution to these problems can comprise tuning, by the system, the automatic speech recognition machine learning model with an additional language added to the set of target languages, wherein the tuning comprises: locking, by the system, parameters within the rows of the mapping matrix; expanding, by the system, the mapping matrix with an additional row for the additional language; leaning, by the system, specialist scores for the additional row of the mapping matrix; generating, by the system, a binary mask for the additional language; and adapting, by the system, the automatic speech recognition machine learning model to the additional language by applying the binary mask to the one or more pretrained weights of the projection layer. By locking the previously learned parameters, the ASR model avoids the issues of overfitting and catastrophic forgetting indicative of other approaches. Furthermore, the tuning method described above enables the ASR machine learning model to be adapted to low-resource languages by utilizing the previously learned shared weights across other languages in the set of target languages.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting use ASR systems 102 that can facilitate training of a multilingual ASR machine learning model and tuning of the model to adapt to low-resource languages. Aspects of systems (e.g., system 102, and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, e.g., computers, computing devices, virtual machines, etc. can cause the machines to perform the operations described. System 102 can comprise ASR modular learning component 104, processor 106 and memory 108. ASR modular learning component 104 can further comprise ASR machine learning model 110, training component 112 and tuning component 114.

In various embodiments, system 102 can comprise a processor 106 (e.g., a computer processing unit, microprocessor) and a computer-readable memory 108 that is operably connected to the processor 106. The memory 108 can store computer-executable instructions which, upon execution by the processor, can cause the processor 106 and/or other components of the system 102 (e.g., ASR machine learning model 110, training component 112 and/or tuning component 114) to perform one or more acts. In various embodiments, memory 108 can store computer-executable components (e.g., ASR machine learning model 110, training component 112 and/or tuning component 114) and the processor 106 can execute the computer-executable components.

In one or more embodiments, training component 112 can train an automatic speech recognition machine learning model (e.g., ASR machine learning model 110) to learn shared weights across one or more languages in a set of target languages, wherein the training comprises, learning, using a projection layer of the automatic speech recognition machine learning model, a mapping matrix comprising rows of specialist scores for the one or more languages in the set of target languages; generating a set of binary masks for the one or more languages in the set of target languages; and adapting the automatic speech recognition machine learning model to the one or more languages of the set of target languages by applying the set of binary masks to one or more pretrained weights of the projection layer.

ASR machine learning model 110 can comprise a transformer with self-attention modules. In ASR machine learning model 110, the original projection layers and the query key value (QKV) layer are replaced with an artisan projection layer (alternatively referred to as the projection layer). The purpose of the projection layer is to learn shared weights across all languages in a set of target languages $\mathcal{L}$ while allowing different languages to select different sub-modules. The projection layer comprises three sets of parameters, pretrained weights inherited from the original projection and QKV layers, a set of specialist scores that comprise the same shape as the pretrained weights, and a mapping matrix that specified which specialist scores to utilize for each of the respective languages in $\mathcal{L}$. As the specialist scores are the same shape as the pretrained weights, the specialist scores can be combined to generate binary masks for each of the languages that can then be applied on to the pretrained weights.

The projection layer incorporates sub-modules capable of adapting the outputs of the ASR machine learning model 110 to different languages and these sub-modules can be shared adaptively across different languages based on the characteristics of the languages. The mapping matrix T can be utilized to guide the adaptive summation of specialist scores to generate a distinct set of binary masks for different target languages. The binary masks can then be applied to the pretrained weights, thereby adapting ASR machine learning model 110 to different target languages. Given a QKV or original projection layers with a weight tensor of $$W \in \mathbb{R}^{c_{in} \times c_{out}},$$

wherein $c_{in}$ and $c_{out}$ are the number of input and output channels, respectively, the projection layer introduces a set of K specialist scores, wherein each specialist score $$M_k \in \mathbb{R}^{c_{in} \times c_{out}},$$

wherein ($k \in [K]$) and K is a hyperparameter of ASR machine learning model 110. The projection layer further introduces the mapping matrix $T \in \mathbb{R}^{L \times K}$, where the non-zero elements in each row of T indicate the specialist scores to utilize for the target language corresponding to the respective row. For a given language l, the projection layer first generates a corresponding mask score $S_l$ by summing over a selected subset of the specialist scores defined as $$S_l = \sum_{k=1}^{K} M_k \times \mathbb{1}_{\sigma(T[l,k])>0.5} \quad (1)$$

wherein $\mathbb{1}_{f(\cdot)}$ is an indicator function conditioned on $f(\cdot)$ and $\sigma(\cdot)$ is the Sigmoid function. Then for a target language l, given a present sparsity ration t (e.g., t=30%, which is a hyperparameter in ASR machine learning model 110), the corresponding binary mask $$B_l = \mathbb{1}_{S_l > r} \quad (2)$$

wherein r is the $\lceil (1-t) \times c_{in} \times c_{out} \rceil$-th largest element in S and $\lceil \cdot \rceil$ is the ceiling operator. The weight tensor $W_l$ of the corresponding projection layer is generated with the equation $$W_l = W \odot B_l \quad (3)$$

where $\odot$ is the element-wise product operator.

In order for training component 112 to train ASR machine learning model 110, the training objective can be defined as $$\min_{\mathcal{W},\mathcal{T},\mathcal{M}} \sum_{l \in \mathcal{L}} \sum_{(x,y) \in \mathcal{D}_l} \mathcal{J}(f(x; \mathcal{W}, \mathcal{T}, \mathcal{M}), y) \quad (4)$$

Where $\mathcal{J}(\cdot)$ is the connectionist temporal classification (CTC) loss, (x,y) are the audio inputs and corresponding transcriptions of training dataset $\mathcal{D}_l$ corresponding to language l, and $f(\cdot)$ is ASR machine learning model 110 parameterized by $\mathcal{W}$ (e.g., the total set of vanilla parameter weights), $\mathcal{T}$ (e.g., the total set of mapping matrices) and $\mathcal{M}$ (e.g., the total set of specialist scores). Training component 112 can optimize equation 4 in an end-to-end manner to train the projection layer towards its maximum potential. However, there are two challenges. First, training a modular model with a mapping matrix can be problematic, as certain $T \in \mathcal{T}$ may collapse into a high entropy or non-sparse distribution. This issue (referred to as collapse of $\mathcal{T}$) hinders models from learning distinct features across different modules (e.g., the various specialist scores) and thus the capability to generate sufficiently different outputs for different languages. Second, mask tuning utilizes a low-noise condition. This issue (referred to as mask convergence) makes it difficult for the model to lean an optimal set of masks when the mapping matrix T undergoes rapid changes during training.

To address the collapse of T, training component 112 can manipulate the learning rate and the update frequency of all elements in T. Specifically, training component 112 can increase the learning rate of all $T \in \mathcal{T}$ to be larger that all other parameters in ASR machine learning model 110 by a times and only update $T \in \mathcal{T}$ every $\beta$ iterations, while all other parameters are updated on each iteration. Due to the higher learning rate for T, training component 112 enables a decisive selection of specialist scores during training (e.g., given a specialist score $M_k$ and a target language l, $\sigma(T[l, k]) \approx 0$ or $\sigma(T[l, k]) \approx 1$). This prevents ASR machine learning model 110 from frequently alternating between selecting and deselecting a specific specialist score for a given language in consecutive updates. By lowering the update frequency for T, the selected specialist scores can undergo several updates before updating T. This can increase the standard deviation of T, which indicates a better determination of specialist scores for each of the target languages.

In one or more embodiments, to address mask convergence, training component 112 can utilize a prune-then-grow pipeline. This pipeline first prunes less important weight elements by setting them to zero and then tunes the full model including these zeroed-out weight elements, providing them with a chance to grow back. As ASR machine learning model 110 generates a distinct set of binary masks for each target language, directly setting the less important weight elements to zero based on one set of binary masks will sabotage other sets of binary masks. To address this issue, training component 112 can alternate between updating $\mathcal{W}$ and $\mathcal{M}$ every $\gamma$ iterations. This trains $\mathcal{M}$ to produce effective binary masks for different languages and adjusts $\mathcal{W}$ to better accommodate the binary masks generated by $\mathcal{M}$.

In one or more embodiments, tuning component 114 can tune the automatic speech recognition machine learning model (e.g., ASR machine learning model 110) with an additional language added to the set of target languages. For example, the tuning can comprise locking parameters within the rows of the mapping matrix; expanding the mapping matrix with an additional row for the additional language; leaning specialist scores for the additional row of the mapping matrix; generating a binary mask for the additional language; and adapting the automatic speech recognition machine learning model to the additional language by applying the binary mask to the one or more pretrained weights of the projection layer. Given a new language l' for the set of target languages, tuning component train ASR machine learning model 110 to learn the new language by learning a new combination of specialist scores for the new language and inserting and optimizing a new row in the mapping matrix for the new language.

More formally, during tuning, tuning component 114 locks all parameters in ASR machine learning model 110 to preserve the knowledge learned for the previous languages as trained by training component 112. Then tuning component 114 adds two additional sets of parameters to ASR machine learning model 110. First a randomly initialized classification layer $$W'_{cls}$$

for better adapting to the characteristics of language l'. Secondly, an additional row T' is added to each of the mapping matrices, thereby extending $T \in \mathcal{T}$ to $[T\ T'] \in \mathcal{T}'$, wherein T' represents the learnable specialist scores combination strategy for l' and $\mathcal{T}'$ is the total set of extended mapping matrices. Given the training dataset $\mathcal{D}'$ corresponding to l' tuning component 114 optimizes the following object train ASR machine learning model 110 on the new language.

$$\min_{\mathcal{T}', W'_{cls}} \sum_{(x,y) \in \mathcal{D}'} \mathcal{J}(f(x; \mathcal{W} \cup \{W'_{cls}\}, \mathcal{T}', M), y) \tag{5}$$

Due to this tuning procedure, the previously learned languages can be utilized to learn low-resource languages, due to the learned phonetic and syntactic similarities, which would otherwise not be learnable due to limited training data.

Figure 2:
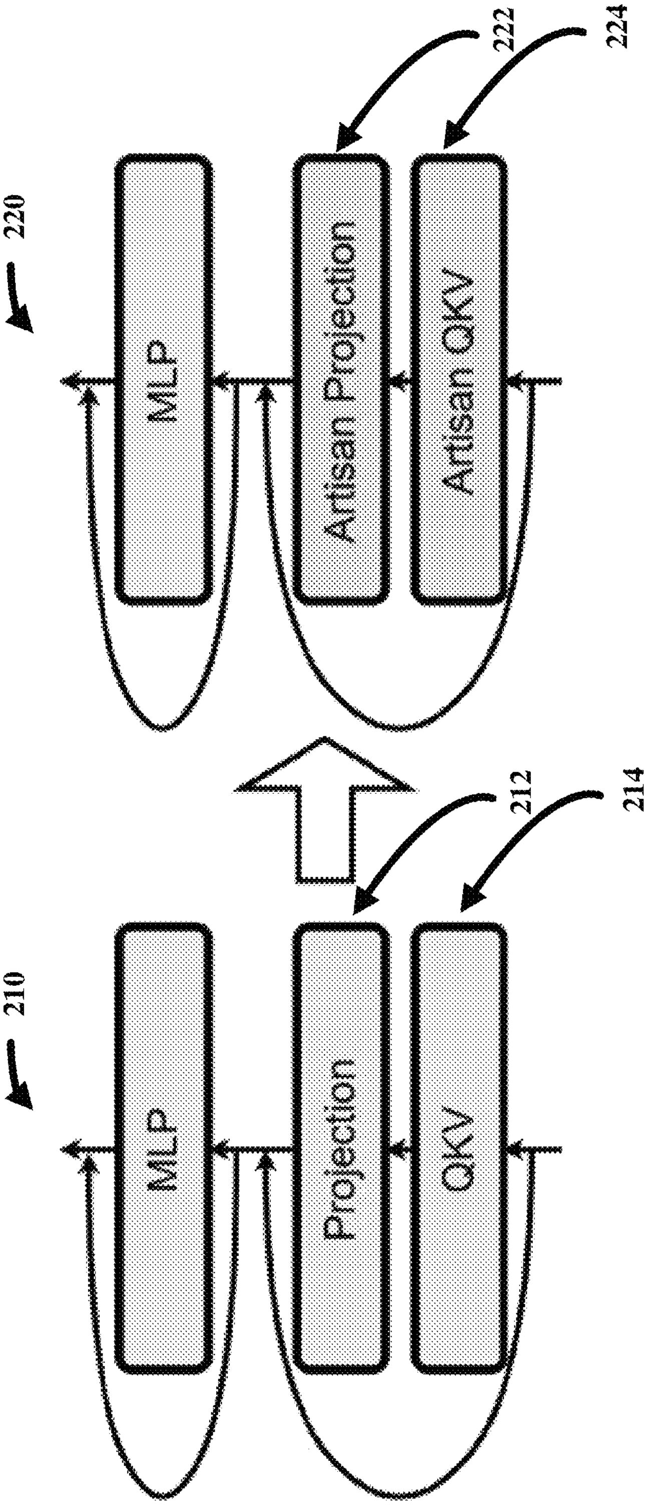
FIG. 2 illustrates a comparison between a pretrained machine learning model and an ASR machine learning model in accordance with one or more embodiments described herein.

FIG. 2 illustrates a comparison between a pretrained machine learning model and an ASR machine learning model in accordance with one or more embodiments described herein.

Model 210 is an example of a vanilla pretrained machine learning model with original projection layer 212 and original QKV layer 214. As describe above in relation to FIG. 1, in ASR machine learning model 220, original projection layer 212 can be replaced with artisan projection layer 222 (e.g., the projection layer as described above in relation to FIG. 1) and QKV layer 214 can be replaced with artisan QKV layer 224.

Figure 3:
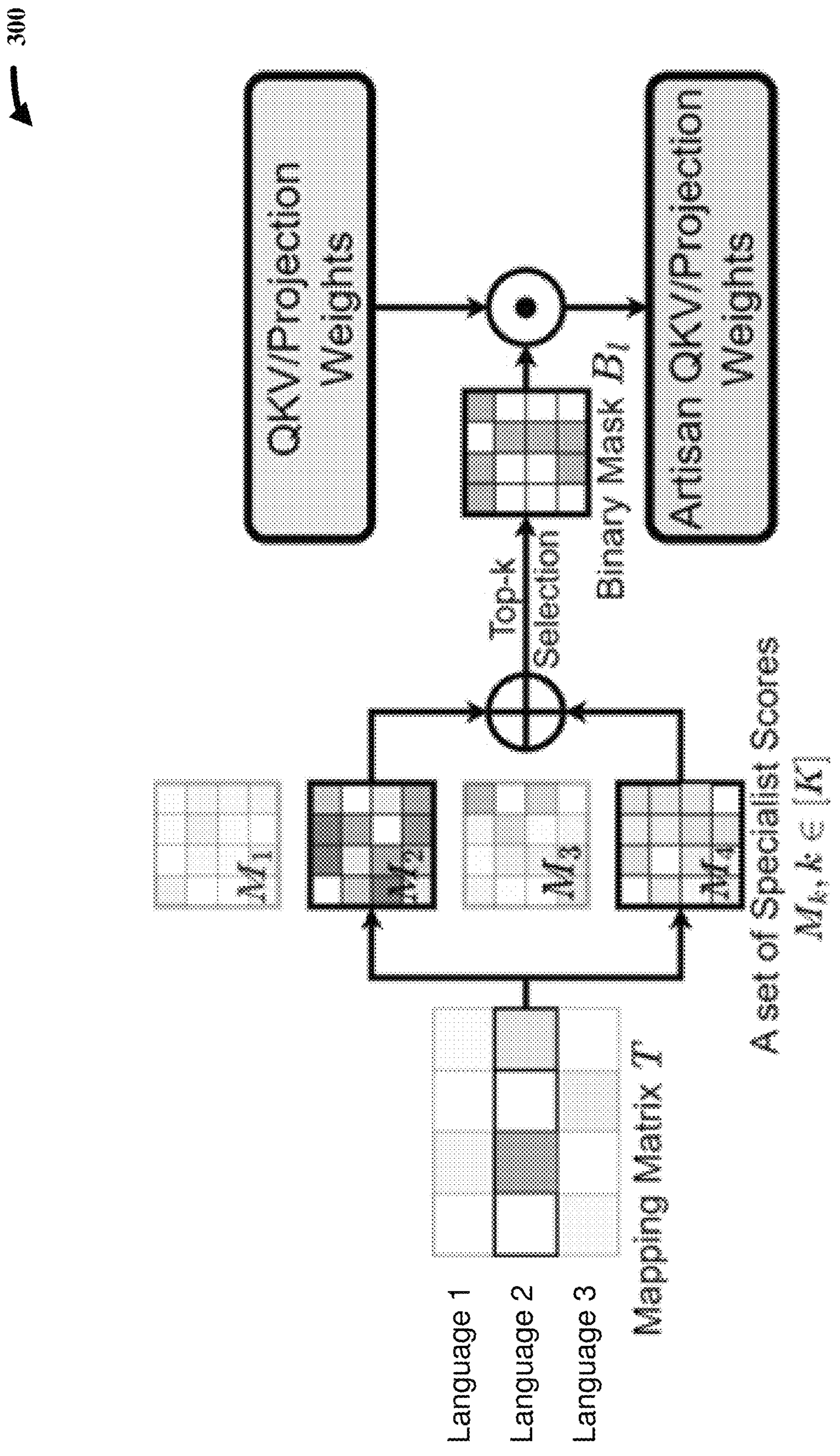
FIG. 3 illustrates an example of a projection layer of an ASR machine learning model in accordance with one or more embodiments described herein.

FIG. 3 illustrates an example of a projection layer 300 of an ASR machine learning model in accordance with one or more embodiments described herein. As shown, projection layer 300 comprises three parameters; QKV/projection weights inherited from the original pretrained machine learning model, a set of specialist scores ($M_1$, $M_2$, $M_3$, $M_4$), and mapping matrix T. Mapping matrix T comprises rows for each of the languages in the set of target languages, listed as Language 1, Language 2, and Language 3. The rows for the respective languages indicated which specialist scores should be combined for each respective language. For example, the row for Language 2 comprises non-zero values in the second and fourth rows, indicating that, for Language 2, the second and fourth specialist scores should be combined (e.g., $M_2$ and $M_4$) to create the binary mask for Language 2. This binary mask is then layered on top of the QKV/Projection weights to generate the artisan QKV/projection weights for Language 2. Similarly, the row for Language 1 comprises non-zero values in the first, second and third rows, indicating that, for Language 1, the first, second and fourth specialist scores should be combined (e.g., $M_1$, $M_2$, and $M_4$) to create the binary mask for Language 1. This generation of binary masks for the respective languages enables the ASR machine learning model to rapidly switch between the languages of the target set. For example, to switch from Language 1 to Language 2, projection layer 300 simply swaps which binary mask to layer of the QKV/Projections weights. In this manner, ASR machine learning model can rapidly switch between trained languages without changing any weight values, or degrading performance on any of the trained languages. It should be appreciated that in one or more embodiments, the ASR machine learning model described herein can learn languages that utilize different script types or alphabets. For example, the ASR machine learning model described herein can learn languages that utilize the Latin script, the Cyrillic script, ideogrammatic scripts (e.g., scripts wherein characters represent syllables) and/or any other form of script or alphabet for a language.

Figure 4:
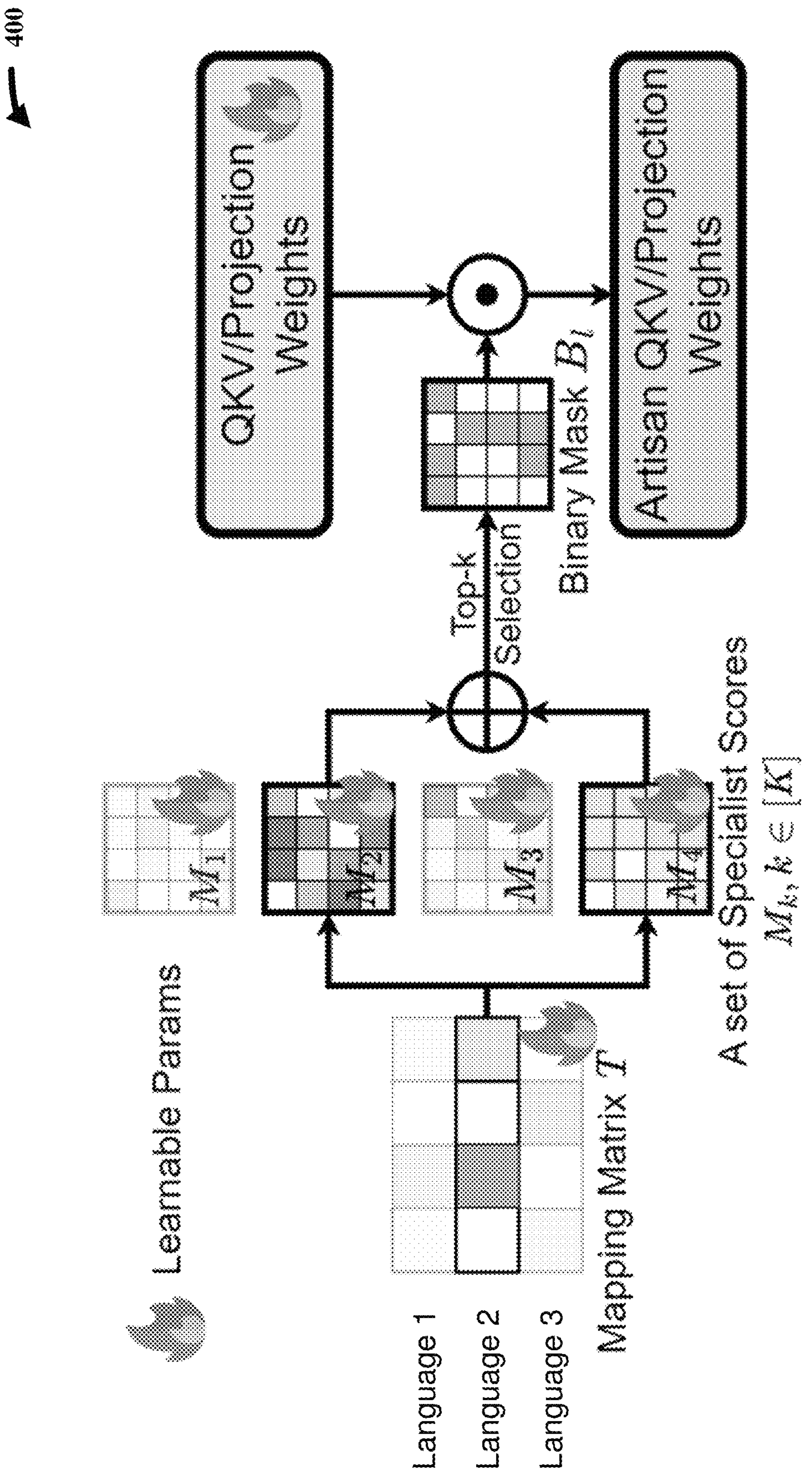
FIG. 4 illustrates an example diagram of training a projection of an ASR machine learning model in accordance with one or more embodiments described herein.

FIG. 4 illustrates an example diagram 400 of training a projection of an ASR machine learning model in accordance with one or more embodiments described herein. As described above in relation to FIG., training component 112 can train a projection layer to learn both a set of specialist scores and mapping matrix of which specialist score to use for the respective languages in a set of target languages. For example, as described above in relation to FIG. 1, training component 112 can manipulate the learning rate for mapping matrix T, such that the learning rate for mapping matrix T is greater than other parameters (e.g., the specialist scores $M_1$, $M_2$, and $M_4$ and the QKV/Projection weights) but mapping matrix T is only updated every β iterations. This prevents mapping matrix T from constantly selecting and deselecting the same specialist scores on subsequent iterations. Furthermore, this enables the specialist scores to be updated several times before mapping matrix T is updated, enabling better selection of appropriate specialist scores during training. Furthermore, training component 112 can alternate between updating the specialist scores and the QKV/Projection weights every γ iterations. This enables the QKV/Projection weights to adjust to better accommodate the binary masks produced by combining the various specialist scores. In this manner, training component 112 can enable the projection layer to simultaneously learn the mapping matrix T, the specialist scores, and the QKV/Projection weights (e.g., the shared weight values between all the languages in the set of target languages).

Figure 5:
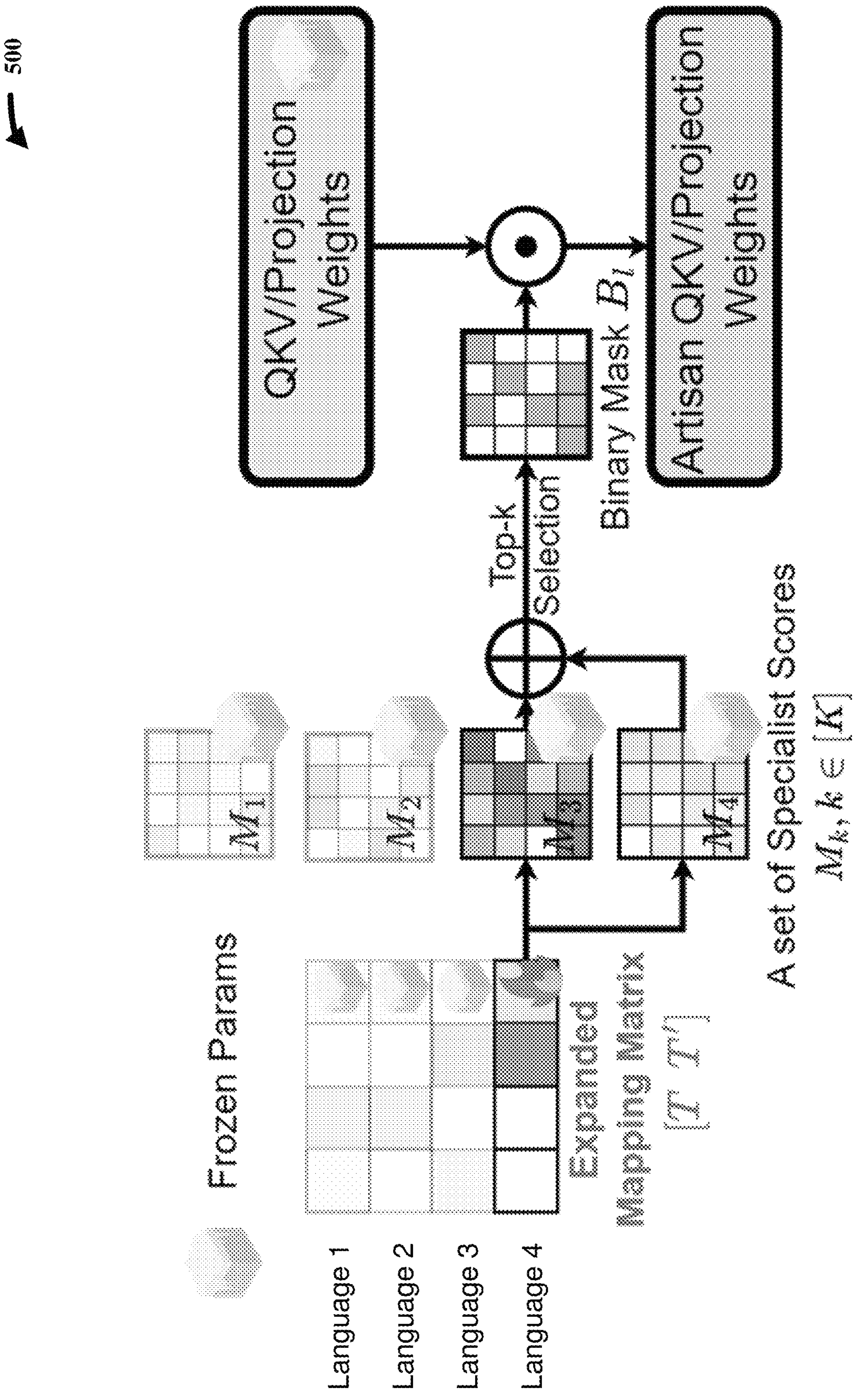
FIG. 5 illustrates an example diagram of tuning a projection layer with an additional language in accordance with one or more embodiments described herein.

FIG. 5 illustrates an example diagram 500 of tuning a projection layer with an additional language in accordance with one or more embodiments described herein. As described above in relation to FIG. 1, tuning component 114 can tune a projection layer of an ASR machine learning model to learn an additional language. For example, as shown in diagram 500, the projection layer has previously been trained on Language 1, Language 2, and Language 3 (as described above in relation to FIG. 4). In order to additionally train the projection layer on an additional language, in this example listed as Language 4, tuning component 114 can lock or freeze all parameters within the projection layer. For example, the mapping matrix T, the specialist scores $M_1$, $M_2$, and $M_4$, and the QKV/Projection weights are all locked, alternatively referred to as frozen. By locking these parameters, tuning component 114 ensures that the learning of the additional language, Language 4, will not cause the projection layer to modify or unlearn parameters related to the previously learned languages. Once the parameters are locked, tuning component 114 adds an additional row to mapping matrix T for the new language (e.g., Language 4). As described above in relation to FIG. 1, tuning component 114 then trains the projection layer to learn which specialist scores to select for the new language (e.g., Language 4), and the selected specialist scores are indicated in the row for Language 4 in the mapping matrix T. In this case the selected specialist scores are $M_3$, and $M_4$. The selected specialist scores can then be combined to generate a binary mask for Language 4, which is applied on top of the QKV/Projection weights to adapt the ASR machine learning model to use for Language 4. By locking the previously learned parameters, tuning component 114 can prevent the projection layer from forgetting the previously learned languages while tuning for the new language. Furthermore, this locking of the QKV/Projection weights and the specialist scores enables the tuning component 114 to take advantage of the learned similarities between the previously learned languages during the tunning process for a new language. This enables the new language to be a low-resource language that would ordinarily be unlearnable due to a lack of a sufficient amount of training data. Accordingly, by first training the projection layer on a set of high resource languages simultaneously and then tuning the projection layer for a low-resource language, ASR machine learning model can learn to perform ASR tasks both on multiple languages, but also on languages that would otherwise not be learnable due to limited training data.

FIG. 6 illustrates a chart 600 comparing performances of one or more multilingual ASR approaches in accordance with one or more embodiments described herein. The rows of chart 600 each represent a different multilingual ASR model type and show the computational costs related to generating inferences by the model, training the model and storage costs (e.g., space) for the model as well as the average character error rate (CER) of the inferences produced by the model across all languages in a target language set. A lower CER indicates fewer errors in the inferences, and thus better performance. The models shown in chart 600 were trained on a target language set comprising 51 languages. The models compared are a separate weight tuning model (e.g., separate models for each language), which is used as a base line, a shared weight tuning model, a mask tuning model, weight factorization model, a language layers model (e.g., a model comprising a separate layer for each language in the target language set) an ASR-adapter model and the multilingual scalable model (e.g., an ASR model such as that described above in relation to FIGS. 1-5). As shown, the multilingual scalable model described herein provides significant reductions in the computational resources required to perform inferences, train the model, and storage costs, while achieving a high accuracy (e.g., low average CER).

FIG. 7 illustrates a chart 700 comparing performances of one or more multilingual ASR approaches for low-resource languages in accordance with one or more embodiments described herein. The rows of chart 700 each represent a different multilingual ASR model type and illustrate the number of training parameters used, the performance, measured in CER, across six low-resource languages and an average across all six languages. The models compared in chart 700 are a weight tuning model, a mask tuning model, an adapter tuning model, the multilingual scalable model described herein, and a version of the multilingual scalable model described herein with further tuning of the binary masks for the low-resource languages (multilingual scalable model +ft). As shown, the multilingual scalable model offers comparable performance to other models with nearly 50 times fewer parameters. This reduction in learnable parameters means that the model described herein can be effectively tuned for low-resource languages in less time, less training cycles, and with reduced storage requirements in comparison to other model types. Furthermore, as shown by multilingual scalable model +ft superior performance to all other model types can be achieved with additional fine tuning of the binary masks.

Figure 8:
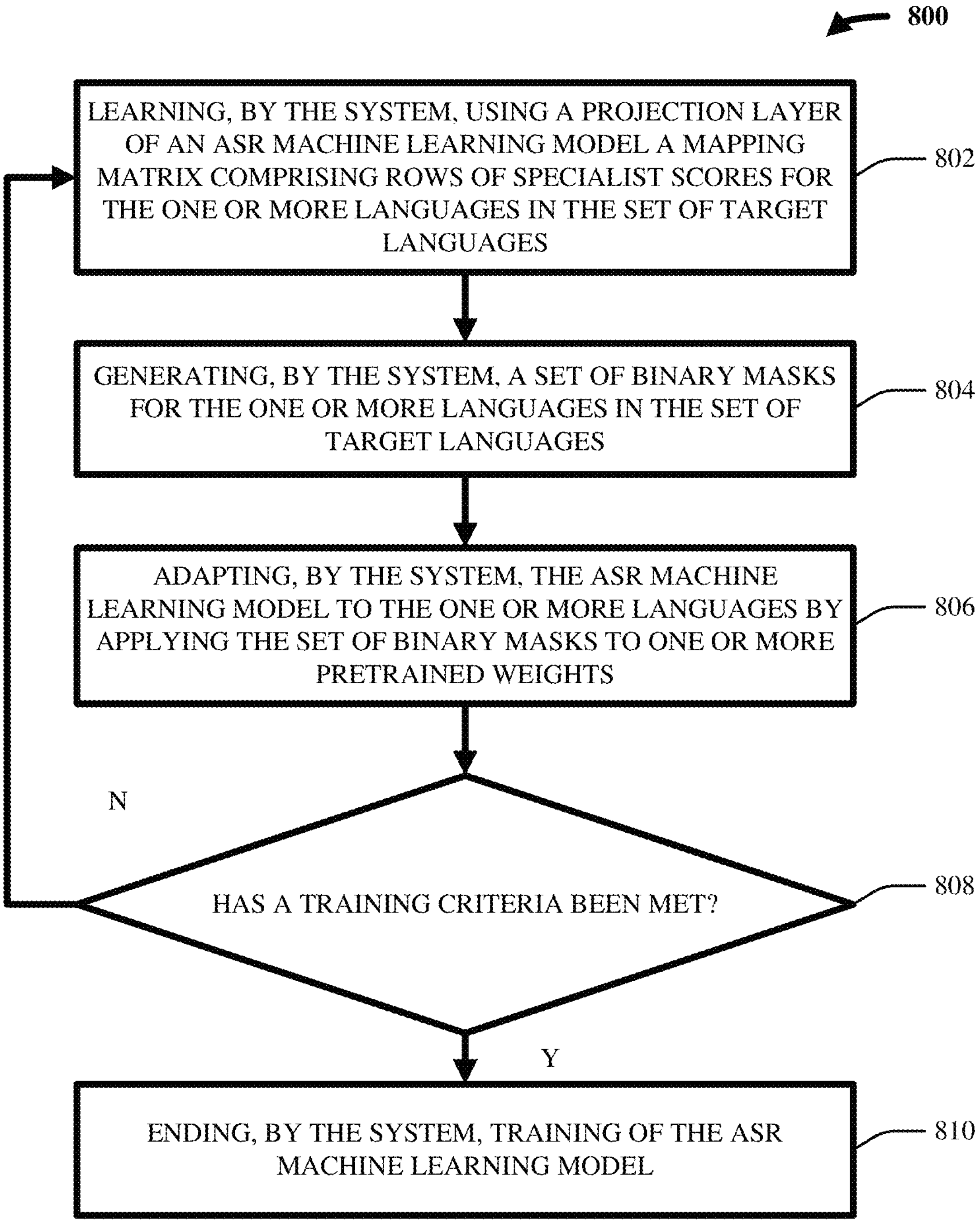
FIG. 8 illustrates a flow diagram of an example, non-limiting, computer implemented method that facilitates training of a multilingual ASR machine learning model in accordance with one or more embodiments described herein.

FIG. 8 illustrates a flow diagram of an example, non-limiting, computer implemented method 800 that facilitates training of a multilingual ASR machine learning model in accordance with one or more embodiments described herein. Repetitive description of like elements employed in other embodiments described herein is omitted for sake of brevity.

At 802, method 800 can comprise learning, by a system (e.g., system 102 and/or training component 112) operatively coupled to a processor (e.g., processor 106), using a projection layer of an ASR machine learning model (e.g., ASR machine learning model 110) a mapping matrix comprising rows of specialist scores for one or more languages in a set of target languages. For example, as described above in relation to FIGS. 1 and 4, the projection layer of ASR machine learning model 110 can learn a mapping matrix that indicates which specialist scores to utilize for each respective language of the set of target languages. Furthermore, the learning can comprise updating the values of the specialist scores and/or updating pretrained weights from a previous layer in ASR machine learning model.

At 804, method 800 can comprise generating, by the system (e.g., system 102 and/or ASR machine learning model 110), a set of binary masks for the one or more languages in the set of target languages. For example, the specialist scores indicated in the mapping matrix for the respective languages can be combined to generate unique binary masks for each of the respective languages in the set of target languages.

At 806, method 800 can comprise adapting, by the system (e.g., system 102 and/or ASR machine learning model 110) the ASR machine learning model to the one or more languages by applying the set of binary masks to one or more pretrained weights. For example, the binary mask for a respective language can be applied to weights inherited from a previous layer of ASR machine learning model 110 to adapt the model to that language. The binary mask can then be swapped with one another to adapt the ASR machine learning model to the various languages in the set of target languages.

At 808, method 800 can comprise determining, by the system (e.g., system 102 and/or training component 112), if a training criteria has been met. In one or more embodiments, the training criteria can comprise a specified number of training iterations or cycles, a specified amount of time, training over a specified amount of training data, the machine learning model achieving a desired performance or accuracy metric, and/or another training criteria specified by an entity. In response to a NO determination, method 800 can return to step 802 and continue the learning process. In response to a YES determination, method 800 can proceed to step 810 and end training of ASR machine learning model 110.

Figure 9:
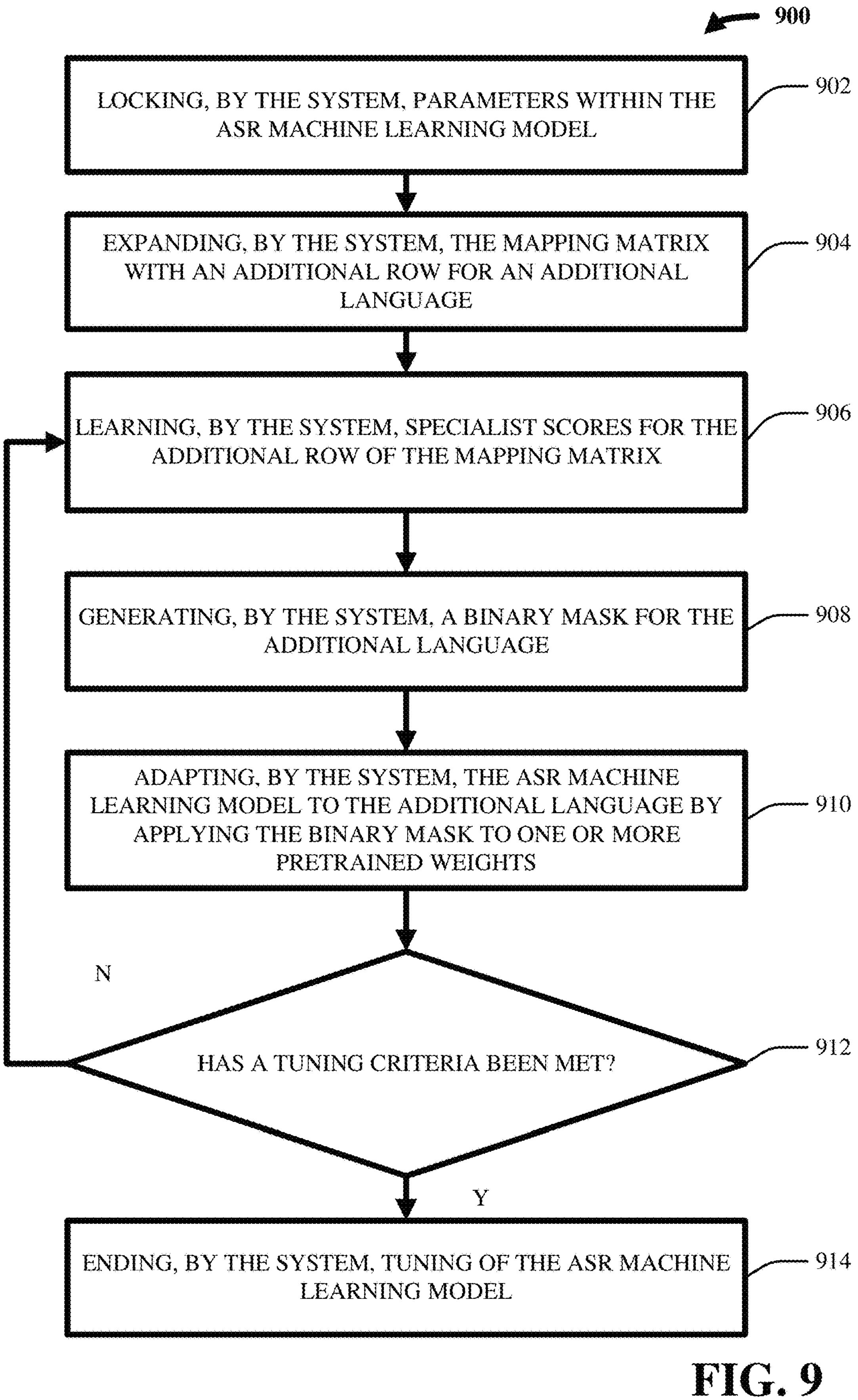
FIG. 9 illustrates a flow diagram of an example, non-limiting, computer implemented method that facilitates tuning of a multilingual ASR machine learning model to learn an additional language in accordance with one or more embodiments described herein.

FIG. 9 illustrates a flow diagram of an example, non-limiting, computer implemented method 900 that facilitates tuning of a multilingual ASR machine learning model to learn an additional language in accordance with one or more embodiments described herein. Repetitive description of like elements employed in other embodiments described herein is omitted for sake of brevity.

At 902, method 900 can comprise locking, by a system (e.g., system 102 and/or training component 112) operatively coupled to a processor (e.g., processor 106), parameters within an ASR machine learning model (e.g., ASR machine learning model 110). For example, as described above in relation to FIGS. 1 and 5, during tuning for an additional language, training component 112 can lock the parameters of a projection layer of ASR machine learning model 110. This ensures that the tuning for the additional language will not negatively impact the ASR machine learning model's performance with respect to the previously learned languages. Furthermore, by locking the parameters, ASR machine learning model 110 can leverage the shared weights learned across the previously learned languages to decrease the amount of training time and/or cycles utilized to learn the additional language. Additionally, this allows for the ASR machine learning model to learn low-resource languages efficiently and accurately.

At 904, method 900 can comprise expanding, by the system (e.g., system 102 and/or training component 112), the mapping matrix with an additional row for an additional language.

At 906, method 900 can comprise learning, by the system (e.g., system 102 and/or training component 112), the specialist scores for the additional row of the mapping matrix. For example, as described above in relation to FIGS. 1 and 5, ASR machine learning model 110 can learn which previously learned specialist scores to combine for the additional language and store the mapping of the specialist score in the additional row of the mapping matrix.

At 908, method 900 can comprise generating, by the system (e.g., system 102 and/or ASR machine learning model 110), a binary mask for the additional language. For example, the specialist scores indicated in the mapping matrix for the additional language can be combined to generate a binary mask for the additional language.

At 910, method 900 can comprise adapting, by the system (e.g., system 102 and/or ASR machine learning model 110) the ASR machine learning model to the additional language by applying the binary mask to one or more pretrained weights. For example, the binary mask for the additional language can be applied to weights inherited from a previous layer of ASR machine learning model 110 to adapt the model to that language. The binary mask can then be swapped with one another to adapt the ASR machine learning model to the various languages in the set of target languages.

At 912, method 900 can comprise determining, by the system (e.g., system 102 and/or tuning component 114), if a tuning criteria has been met. In one or more embodiments, the tuning criteria can comprise a specified number of tuning iterations or cycles, a specified amount of time, tuning over a specified amount of training data, the machine learning model achieving a desired performance or accuracy metric, and/or another tuning criteria specified by an entity. In response to a NO determination, method 900 can return to step 906 and continue the learning process. In response to a YES determination, method 900 can proceed to step 914 and end tuning of ASR machine learning model 110.

System 102 can provide technical improvements to hardware associated with system 102. For example, by enabling a scalable, multilingual ASR machine learning model, system 102 eliminates the need for multiple ASR models for multiple languages, thereby decreasing storage costs associated with performing automatic speech recognition on multiple languages, as shown above in relation to the storage space comparison in FIG. 6. In another example, by training a single machine learning model to perform ASR on multiple languages, system 102 can reduce the training cost (e.g., the workload of the processor associated with training) as discussed above in relation to FIG. 6.

A practical application of system 102 is that enables the training and operation of a scalable, multilanguage machine learning model that address the issues of collapse of J and mask convergence as described above in relation to FIG. 1. This enables ASR machine learning model 110 to perform accurate automatic speech recognition on a variety of languages. A further practical application is that system 102 enables scalability of ASR machine learning models without the need for complete retraining. For example, as described above in relation to FIGS. 1 and 5, by locking or freezing parameters during tuning for additional languages, additional languages can be added to the set of target languages for ASR machine learning model 110 without negatively impacting accuracy of the previously learned languages of the set of target languages. This enables scalability as additional languages can be learned easily and rapidly by the ASR machine learning model. An additional practical application of system 102 is that it enables the ASR machine learning model to learn low-resource languages. For example, by locking weights and specialist scores during tuning for additional languages, system 102 can use the phonetic and syntactic similarities between previous trained languages that are represented in the weights and specialist scores to learn the low-resource additional language with limited training data.

A further application of system 102 is that it can support ASR functions for multiple languages, without the need for individual models or adapters for each supported language. For example, system 102 can facilitate the use of a voice command system that can detect and accept commands in all of the languages system 102 is trained on. In another example, system 102 can enable operations of a multilingual chatbot, wherein ASR machine learning model 110 can detect the different languages ASR machine learning model 110 is trained on, and then the chatbot can output an appropriate response in the detected language.

It is to be appreciated that system 102 can utilize various combination of electrical components, mechanical components, and circuitry that cannot be replicated in the mind of a human or performed by a human as the various operations that can be executed by system 102 and/or components thereof as described herein are operations that are greater than the capability of a human mind. For instance, the amount of data processed, the speed of processing such data, or the types of data processed by system 102 over a certain period of time can be greater, faster, or different than the amount, speed, or data type that can be processed by a human mind over the same period of time. According to several embodiments, system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that system 102 can include information that is impossible to obtain manually by an entity, such as a human user. For example, the type, amount, and/or variety of information included in system 102 can be more complex than information obtained manually by an entity, such as a human user.

Figure 10:
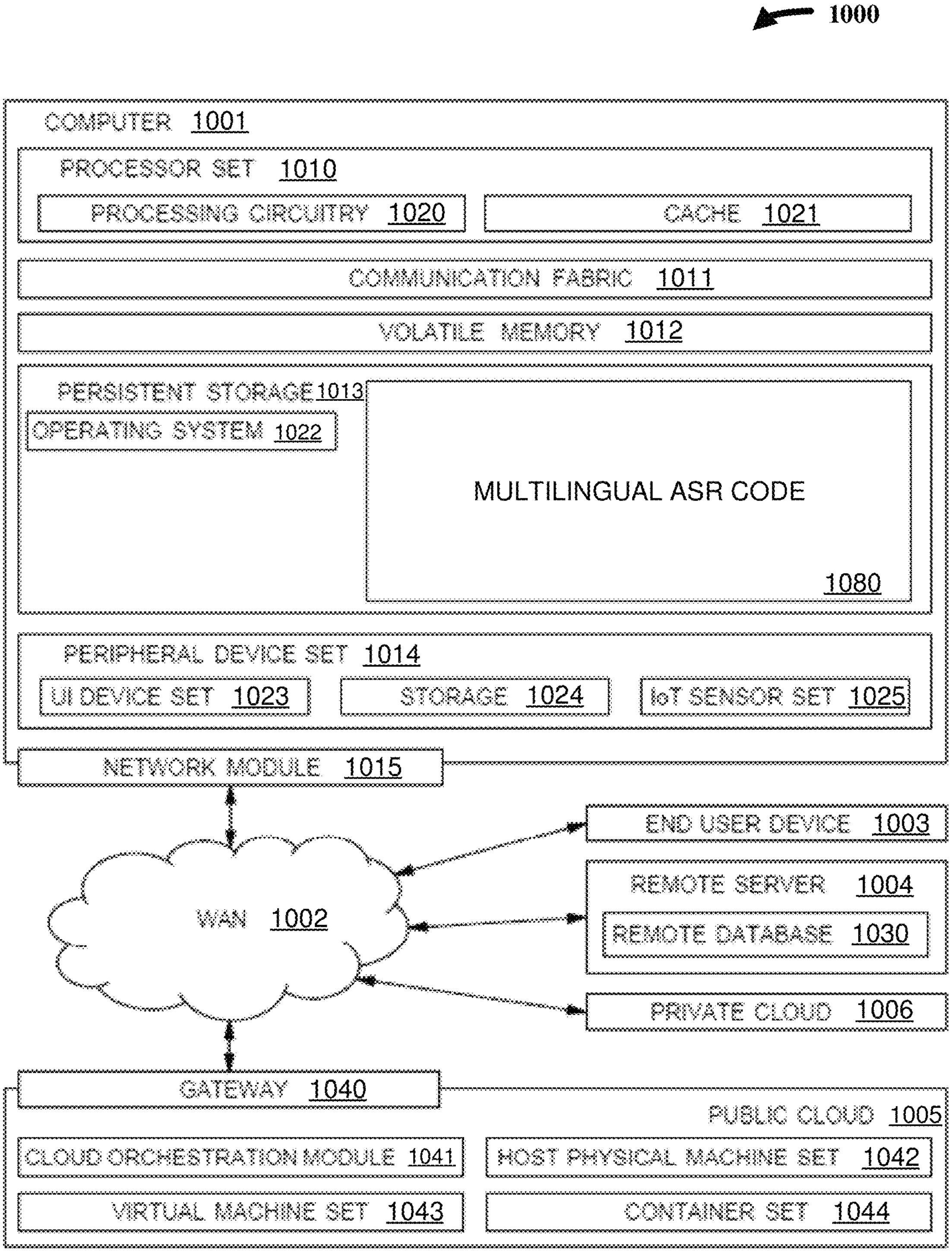
FIG. 10 illustrates an example, a non-limiting environment for the execution of at least some of the computer code in accordance with one or more embodiments described herein.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the multilingual ASR code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs)

typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:

a memory that stores computer executable components;

a processor that executes the computer executable components stored in the memory, wherein the computer executable components comprise:

an automatic speech recognition machine learning model that learns shared weights across one or more languages in a set of target languages, the automatic speech recognition machine learning model comprising a projection layer having pretrained weights inherited from a previously trained model; and a training component that trains the automatic speech recognition machine learning model, wherein the training comprises:

learning, using the projection layer, a mapping matrix having a plurality of rows corresponding respectively to languages of the set of target languages and columns corresponding to individual pretrained weights of the projection layer, the mapping matrix comprising rows of specialist scores for the one or more languages in the set of target languages;

generating a set of binary masks for the one or more languages in the set of target languages by thresholding the specialist scores of the mapping matrix to identify a subset of the pretrained weights associated with each language; and adapting the automatic speech recognition machine learning model to the one or more languages of the set of target languages by selectively activating the subset of pretrained weights of the projection layer according to the generated binary masks while retaining remaining pretrained weights as shared weights across the set of target languages.

2. The system of claim 1, wherein the projection layer inherits the one or more pretrained weights from at least one of a QKV (query key value layer) layer or one or more previous projection layers of the automatic speech recognition machine learning model.

3. The system of claim 1, wherein the computer executable components further comprise:

a tuning component that tunes the automatic speech recognition machine learning model with an additional language added to the set of target languages.

4. The system of claim 3, wherein the tuning comprises:

locking parameters of the projection layer;

expanding the mapping matrix with an additional row for the additional language;

leaning specialist scores for the additional row of the mapping matrix;

generating a binary mask for the additional language; and adapting the automatic speech recognition machine learning model to the additional language by applying the binary mask to the one or more pretrained weights of the projection layer.

5. The system of claim 1, wherein the specialist scores comprise a shared shape with the one or more pretrained weights.

6. The system of claim 1, wherein the automatic speech recognition machine learning model comprises a transformer model.

7. The system of claim 1, wherein the shared weights represent phonetic and syntactic similarities between languages of the set of target languages.

8. A computer-implemented method comprising:

training, by a system operatively coupled to a processor, an automatic speech recognition machine learning model to learn shared weights across one or more languages in a set of target languages, the automatic speech recognition machine learning model comprising a projection layer having pretrained weights inherited from a previously trained speech recognition model, wherein the training comprises:

learning, by the system, using the projection layer of the automatic speech recognition machine learning model, a mapping matrix having a plurality of rows corresponding respectively to languages of the set of target languages and columns corresponding to projection weights of the projection layer, the mapping matrix comprising rows of specialist scores for the one or more languages in the set of target languages;

generating, by the system, a set of binary masks for the one or more languages in the set of target languages based on the specialist scores of the mapping matrix, each binary mask identifying a subset of projection weights associated with a respective language; and adapting, by the system, the automatic speech recognition machine learning model to the one or more languages of the set of target languages by applying the binary mask corresponding to a selected language to modulate outputs of the projection layer using the subset of projection weights identified by the binary mask while maintaining remaining projection weights as shared weights across the set of target languages.

9. The computer-implemented method of claim 8, wherein the projection layer inherits the one or more pretrained weights from at least one of a QKV (query key value layer) layer or one or more previous projection layers of the automatic speech recognition machine learning model.

10. The computer-implemented method of claim 8, further comprising tuning, by the system, the automatic speech recognition machine learning model with an additional language added to the set of target languages.

11. The computer-implemented method of claim 10, wherein the tuning comprises:

locking, by the system, parameters of the projection layer;

expanding, by the system, the mapping matrix with an additional row for the additional language;

leaning, by the system, specialist scores for the additional row of the mapping matrix;

generating, by the system, a binary mask for the additional language; and adapting, by the system, the automatic speech recognition machine learning model to the additional language by applying the binary mask to the one or more pretrained weights of the projection layer.

12. The computer-implemented method of claim 8, wherein the specialist scores comprise a shared shape with the one or more pretrained weights.

13. The computer-implemented method of claim 8, wherein the automatic speech recognition machine learning model comprises a transformer model.

14. The computer-implemented method of claim 8, wherein the shared weights represent phonetic and syntactic similarities between languages of the set of target languages.

15. A computer program product, the computer program product comprising a computer readable storage medium having program instructions embodied therewith, the program instructions executable by a processor to cause the processor to:

train, by the processor, an automatic speech recognition machine learning model to learn shared weights across one or more languages in a set of target languages, the automatic speech recognition machine learning model comprising a projection layer having pretrained weights inherited from a previously trained speech recognition model, wherein the training comprises:

learning, by the processor, using the projection layer of the automatic speech recognition machine learning model, a mapping matrix having a plurality of rows corresponding respectively to languages of the set of target languages and columns corresponding to projection weights of the projection layer, the mapping matrix comprising rows of specialist scores for the one or more languages in the set of target languages;

generating, by the processor, a set of binary masks for the one or more languages in the set of target languages based on the specialist scores of the mapping matrix, each binary mask representing a language-specific selection vector corresponding to the projection weights of the projection layer; and adapting, by the processor, the automatic speech recognition machine learning model to the one or more languages of the set of target languages by selectively applying, by the program instructions, the binary masks to the pretrained weights of the projection layer to enable language-specific specialization of the projection layer while retaining remaining pretrained weights as shared parameters across the set of target languages.

16. The computer program product of claim 15, wherein the projection layer inherits the one or more pretrained weights from at least one of a QKV (query key value layer) layer or one or more previous projection layers of the automatic speech recognition machine learning model.

17. The computer program product of claim 15, wherein the program instructions are further executable to cause the processor to:

tune, by the processor, the automatic speech recognition machine learning model with an additional language added to the set of target languages.

18. The computer program product of claim 17, wherein the tuning comprises:

locking, by the processor, parameters of the projection layer;

expanding, by the processor, the mapping matrix with an additional row for the additional language;

leaning, by the processor, specialist scores for the additional row of the mapping matrix;

generating, by the processor, a binary mask for the additional language; and adapting, by the processor, the automatic speech recognition machine learning model to the additional language by applying the binary mask to the one or more pretrained weights of the projection layer.

19. The computer program product of claim 15, wherein the specialist scores comprise a shared shape with the one or more pretrained weights.

20. The computer program product of claim 15, wherein the shared weights represent phonetic and syntactic similarities between languages of the set of target languages.

* * * * *